United States Patent
Hölle et al.

(10) Patent No.: US 10,710,676 B2
(45) Date of Patent: Jul. 14, 2020

(54) SPROCKET WHEEL FOR A BICYCLE DRIVE

(71) Applicant: SRAM Deutschland GmbH, Schweinfurt (DE)

(72) Inventors: Philipp Hölle, Schweinfurt (DE); Sebastian Reineke, Schweinfurt (DE); Andreas Vonend, Schweinfurt (DE)

(73) Assignee: SRAM DEUTSCHLAND GMBH, Schweinfurt (DE)

( * ) Notice: Subject to any disclaimer, the term of this patent is extended or adjusted under 35 U.S.C. 154(b) by 113 days.

(21) Appl. No.: 15/058,844

(22) Filed: Mar. 2, 2016

(65) Prior Publication Data

US 2016/0257376 A1 Sep. 8, 2016

(30) Foreign Application Priority Data

Mar. 2, 2015 (DE) .......................... 10 2015 203 708

(51) Int. Cl.
 *B62M 9/10* (2006.01)
 *F16H 55/30* (2006.01)
 *C21D 9/32* (2006.01)

(52) U.S. Cl.
 CPC ............... *B62M 9/10* (2013.01); *F16H 55/30* (2013.01); *C21D 9/32* (2013.01)

(58) Field of Classification Search
 CPC .......... B62M 9/10; B62M 9/105; B62M 9/12; F16H 55/30; F16G 13/06
 USPC ....................................................... 474/160
 See application file for complete search history.

(56) References Cited

U.S. PATENT DOCUMENTS

| | | | | |
|---|---|---|---|---|
| 3,477,303 A | * | 11/1969 | Brilando | B62M 9/10 474/144 |
| 3,477,393 A | * | 11/1969 | Bell | A23G 9/282 425/131.1 |
| 3,905,248 A | * | 9/1975 | Peyrard | B62M 9/105 474/160 |
| 4,044,621 A | * | 8/1977 | McGregor, Sr. | B62J 13/00 474/144 |
| 4,380,445 A | * | 4/1983 | Shimano | B62M 9/105 474/144 |
| 4,586,914 A | * | 5/1986 | Nagano | B62M 9/105 474/160 |
| 4,642,075 A | * | 2/1987 | Nagashima | B62M 9/105 474/158 |
| 4,741,724 A | * | 5/1988 | Wang | B62M 9/105 474/160 |
| 5,324,238 A | * | 6/1994 | Karp | B62M 1/10 474/152 |
| 5,480,359 A | * | 1/1996 | Tani | B62M 3/003 474/160 |
| 5,503,600 A | * | 4/1996 | Berecz | B62M 9/10 474/160 |
| 5,954,604 A | * | 9/1999 | Nakamura | B62M 9/10 474/158 |

(Continued)

*Primary Examiner* — Henry Y Liu

(57) ABSTRACT

A sprocket wheel for a bicycle includes a first main surface, which is flat in one or more sections, and a second main surface, which is situated opposite the first main surface. The second main surface is flat in one or more sections and extends parallel to the first main surface in one or more sections. The sprocket wheel also has an outer circumferential surface, which connects the first and the second main surface to one another and on which toothing is provided.

19 Claims, 10 Drawing Sheets

(56) References Cited

U.S. PATENT DOCUMENTS

| | | | |
|---|---|---|---|
| 6,176,798 B1* | 1/2001 | Nakamura | B62M 9/10 474/160 |
| 7,118,505 B2* | 10/2006 | Lee | B62M 9/105 474/152 |
| 8,911,314 B2* | 12/2014 | Braedt | B62M 9/10 474/160 |
| 9,011,282 B2* | 4/2015 | Staples | B62M 9/10 474/160 |
| 2003/0064844 A1* | 4/2003 | Lin | B62M 9/10 474/160 |
| 2005/0090349 A1* | 4/2005 | Lee | B62M 9/105 474/160 |
| 2010/0004081 A1* | 1/2010 | Braedt | B62M 9/12 474/160 |
| 2010/0075791 A1* | 3/2010 | Braedt | B62M 9/10 474/160 |
| 2010/0081531 A1* | 4/2010 | Esquibel | B62M 9/10 474/160 |
| 2011/0092327 A1* | 4/2011 | Oishi | B62M 9/10 474/160 |
| 2011/0105263 A1* | 5/2011 | Braedt | F16H 55/303 474/160 |
| 2012/0202633 A1* | 8/2012 | Wickliffe | B62M 9/105 474/160 |
| 2012/0208662 A1* | 8/2012 | Braedt | B62M 9/10 474/160 |
| 2012/0225745 A1* | 9/2012 | Oishi | B62M 9/10 474/160 |
| 2012/0244976 A1* | 9/2012 | Lin | B62M 9/10 474/160 |
| 2012/0302384 A1* | 11/2012 | Braedt | B62M 9/10 474/160 |
| 2012/0309572 A1* | 12/2012 | Braedt | B62M 9/10 474/160 |
| 2013/0017914 A1* | 1/2013 | Braedt | B62M 9/10 474/160 |

* cited by examiner

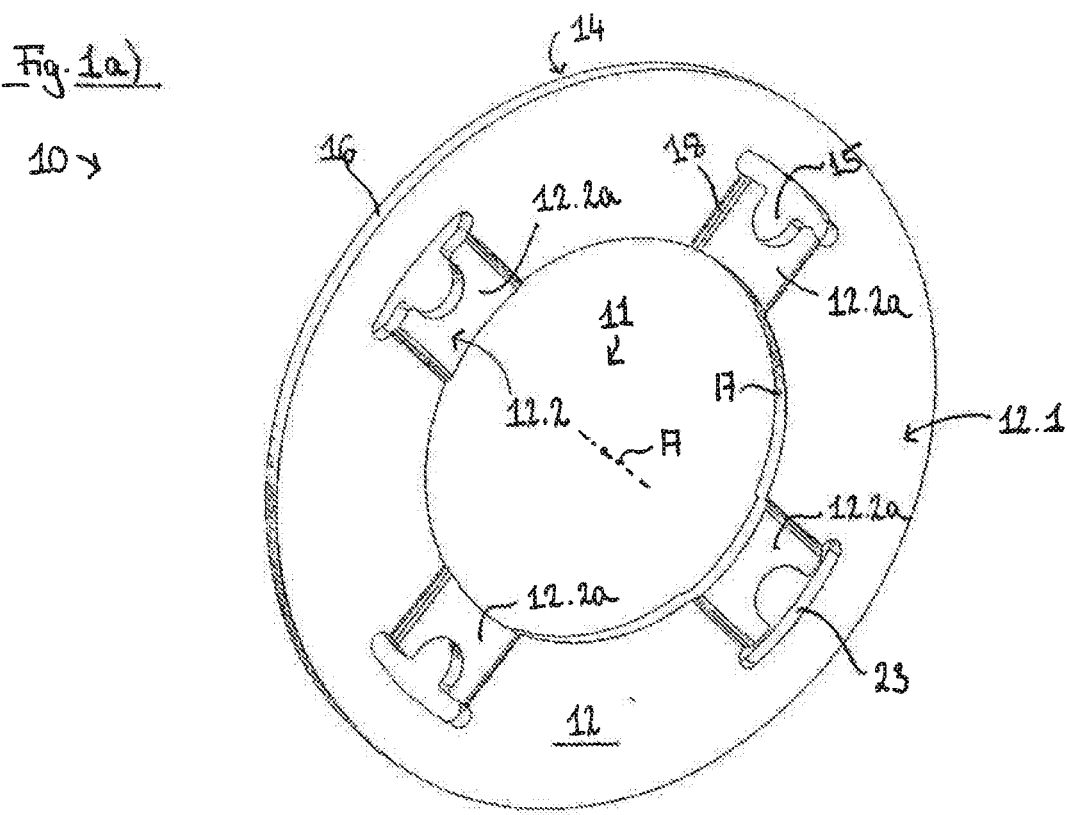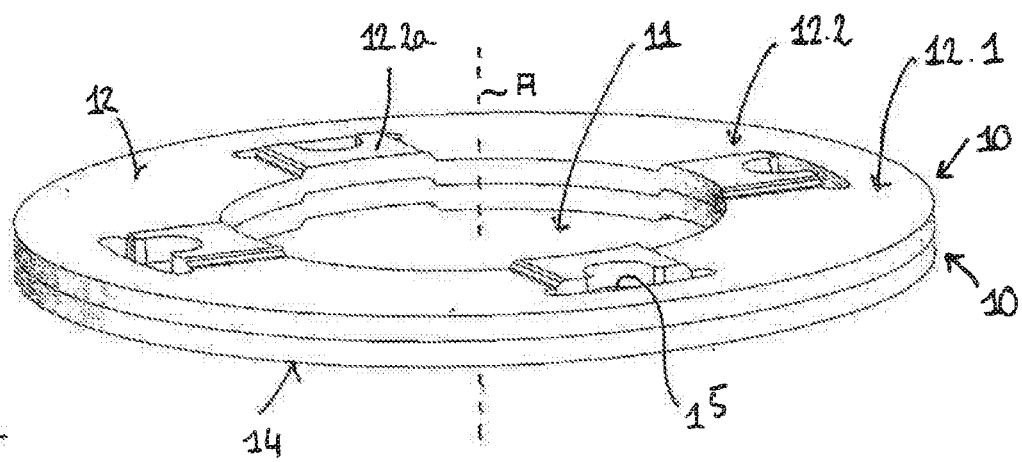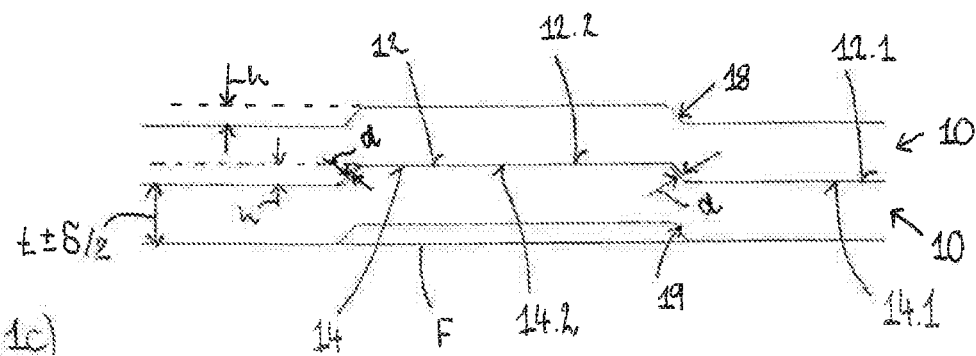

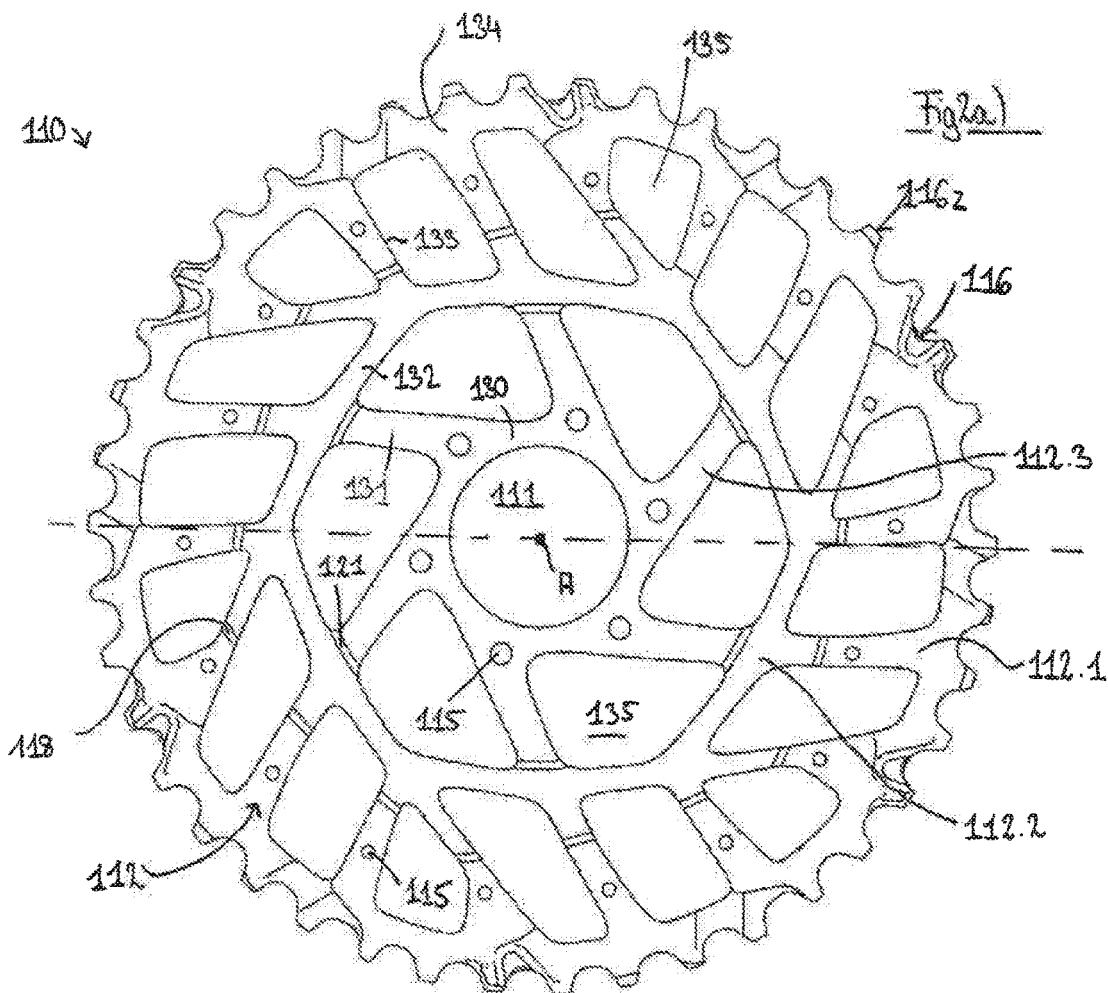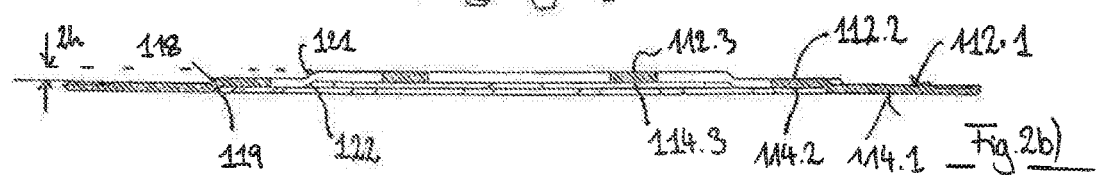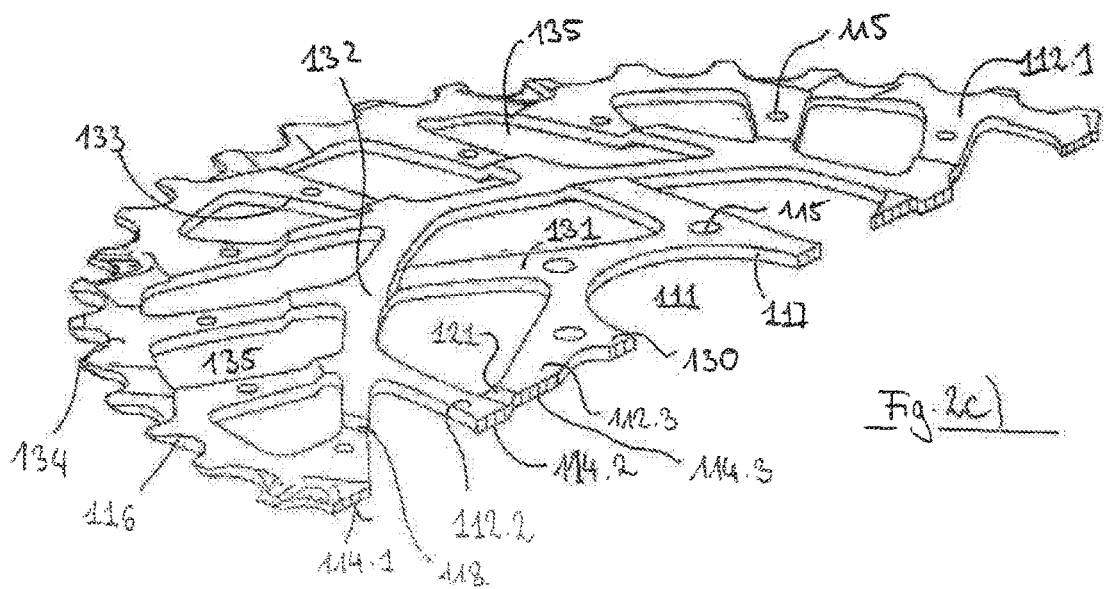

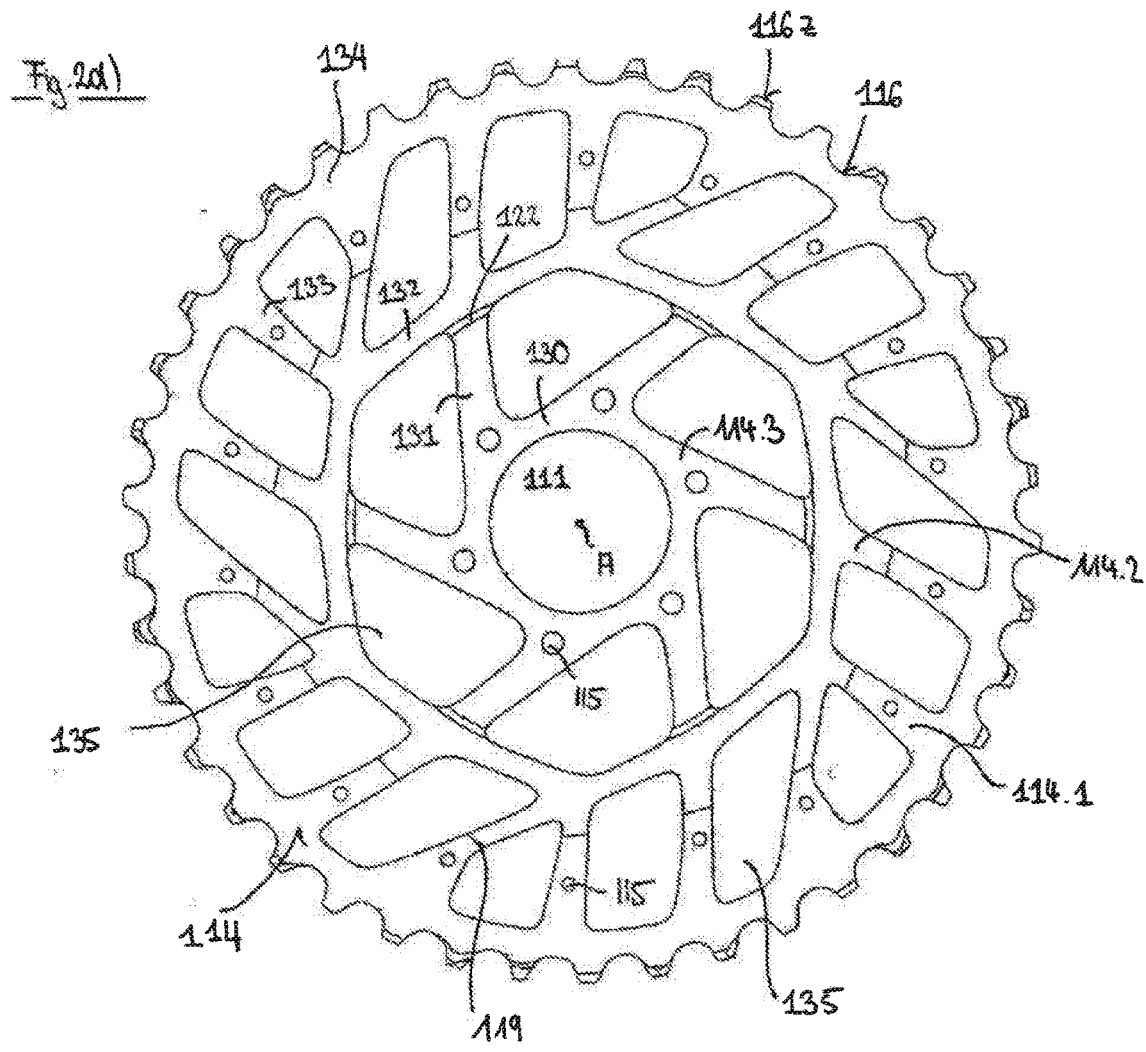
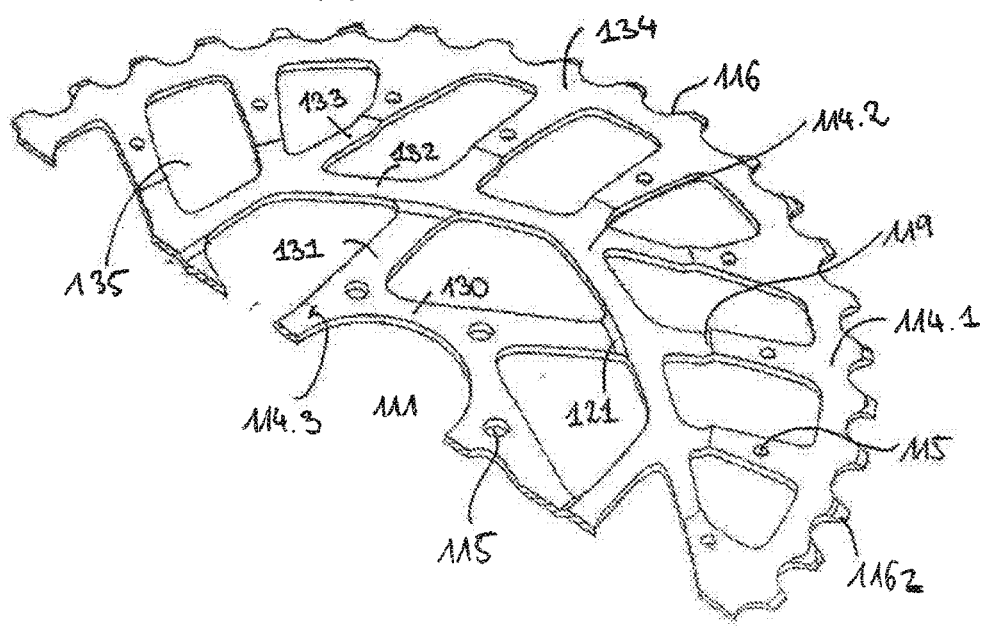

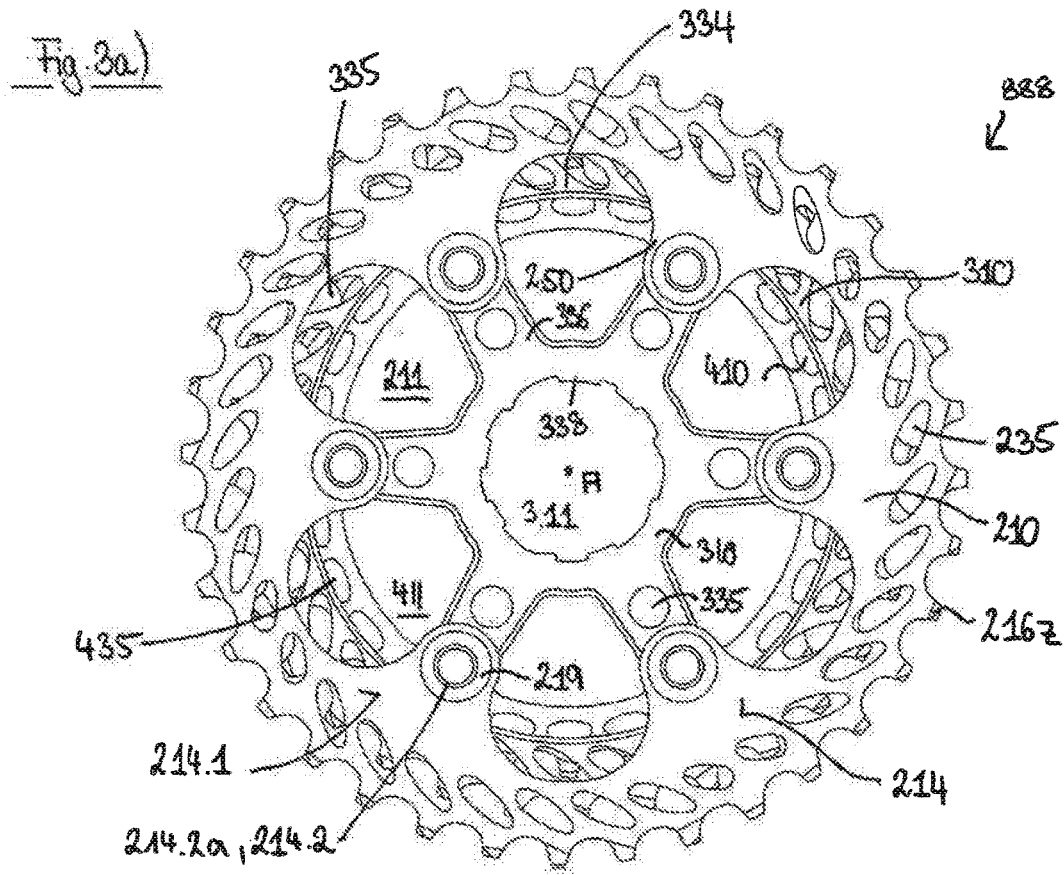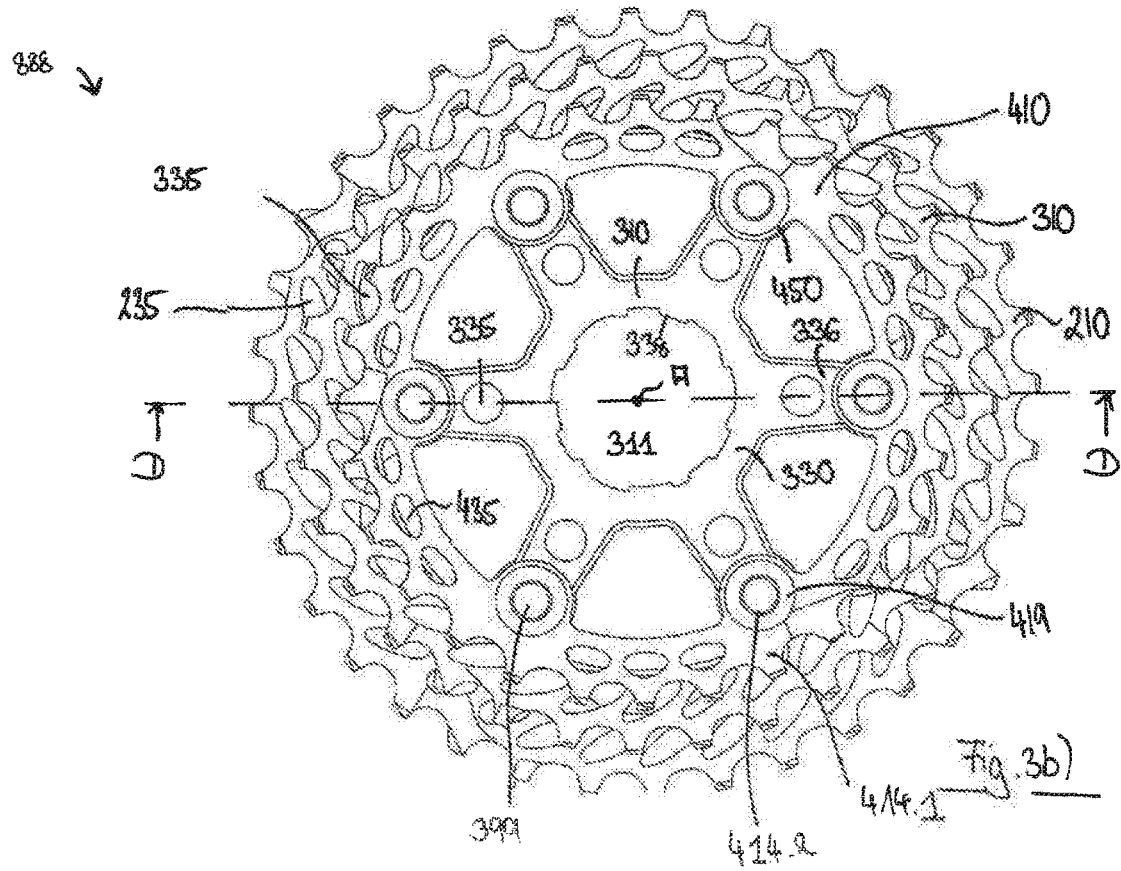

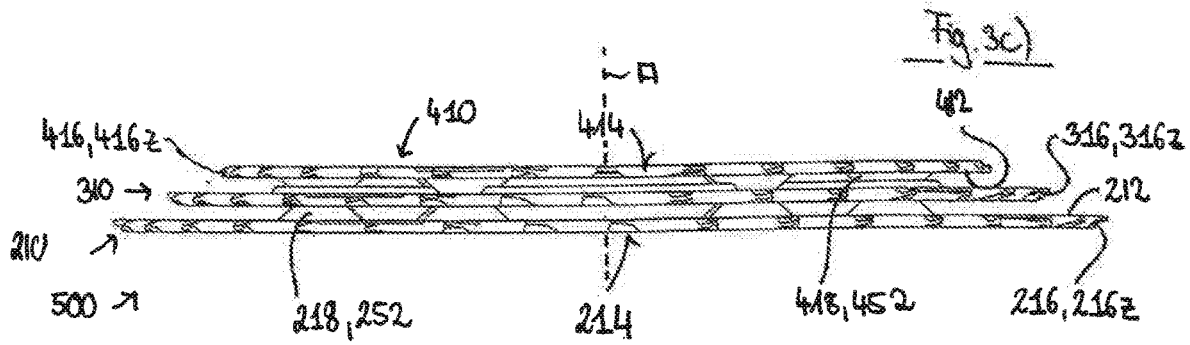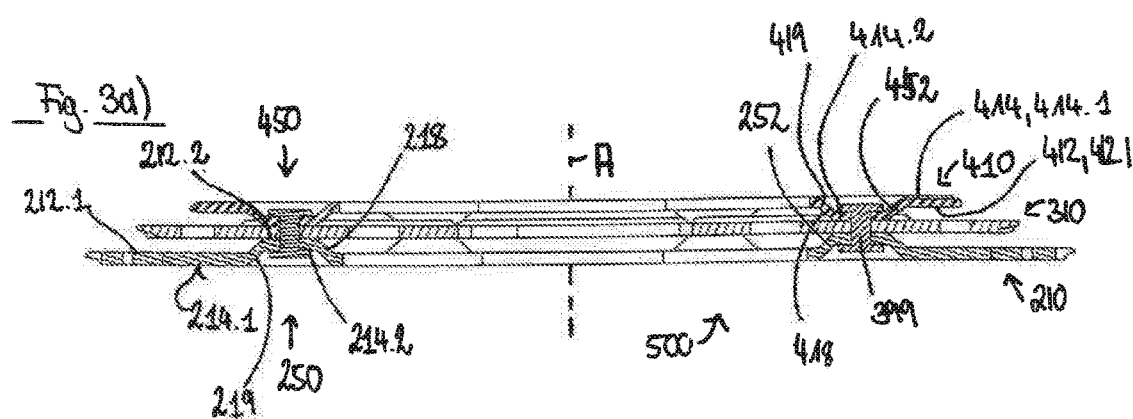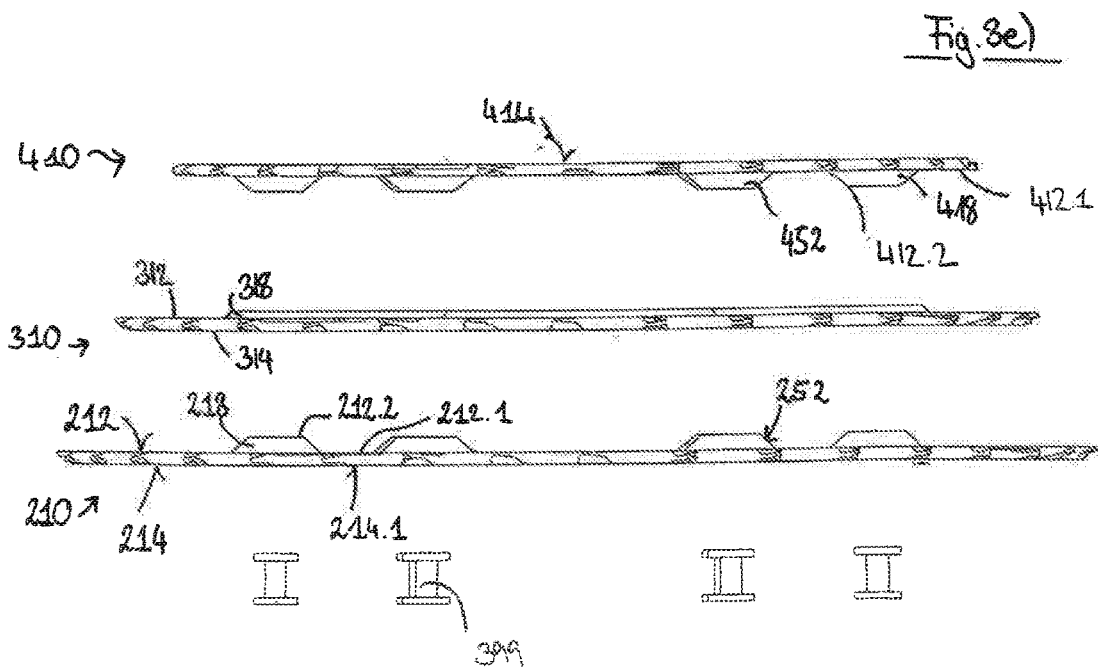

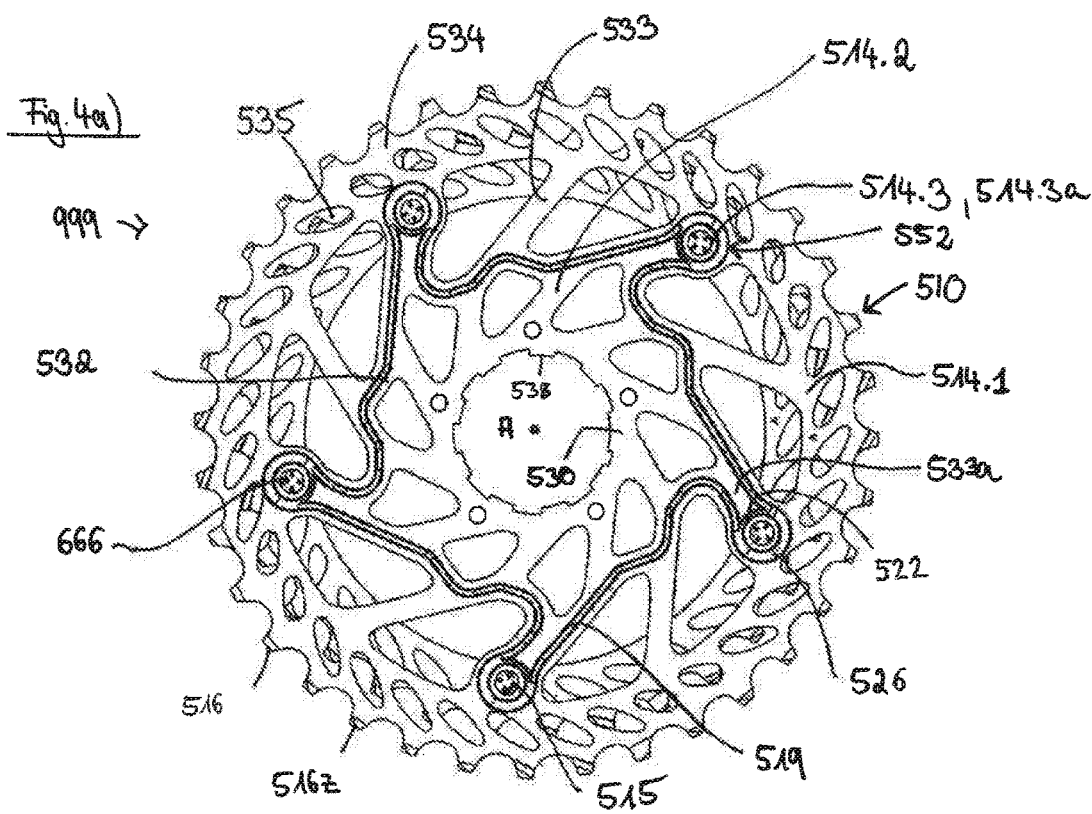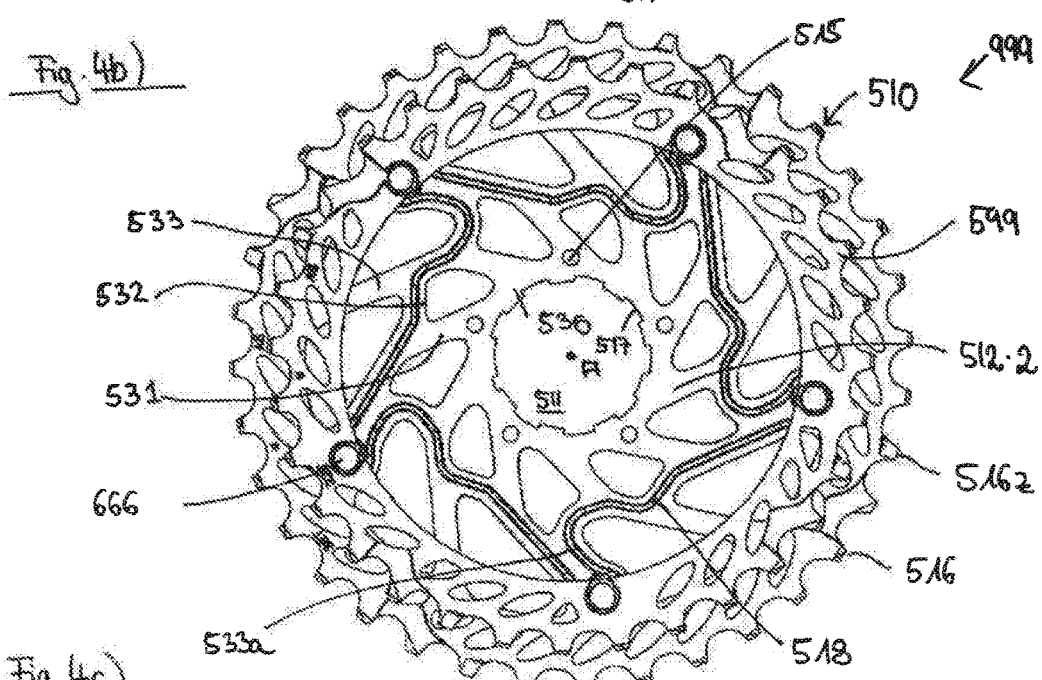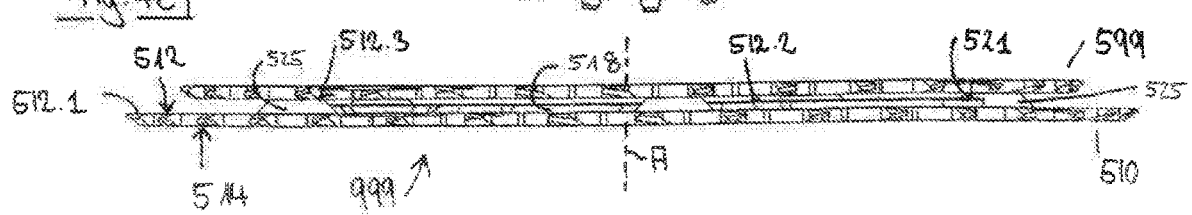

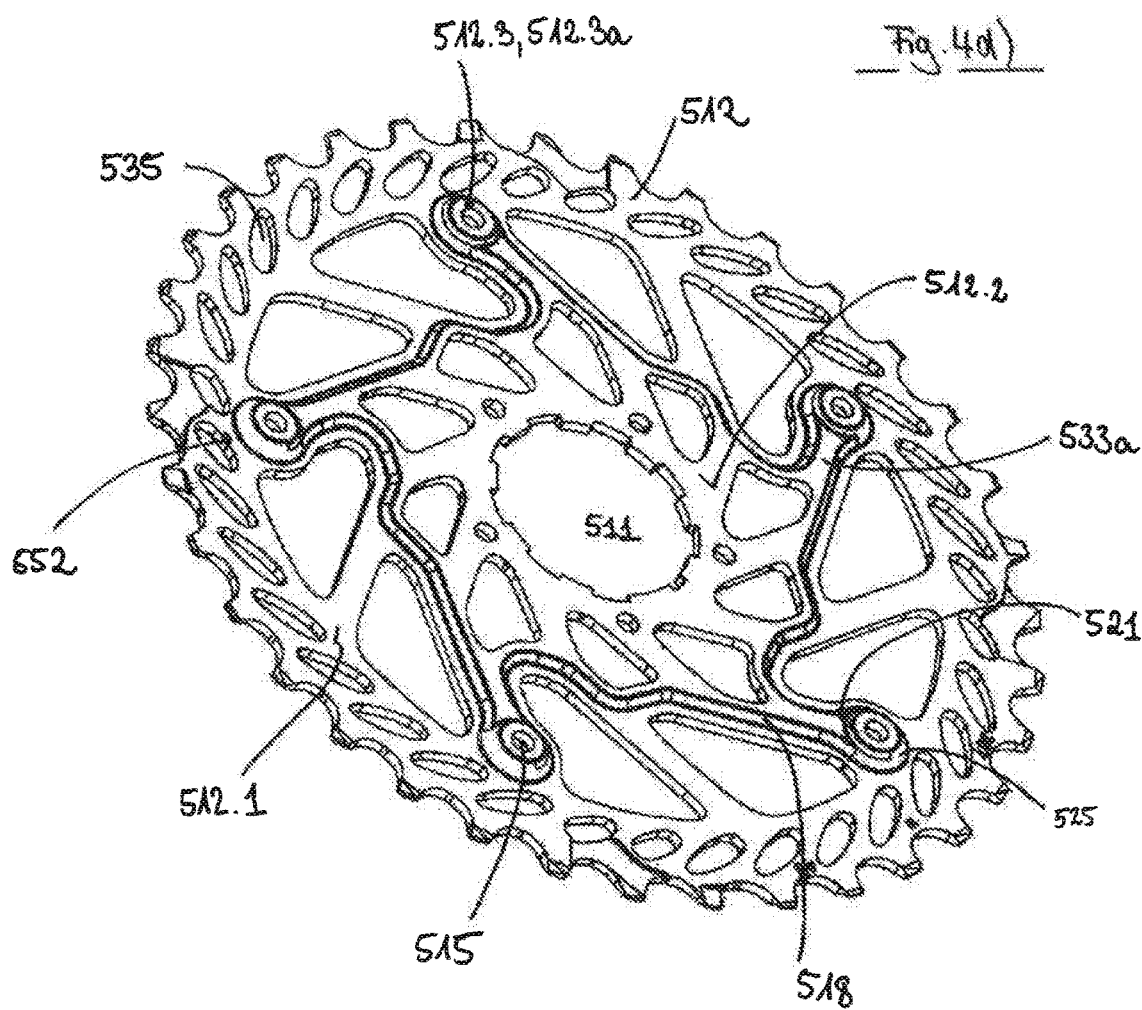
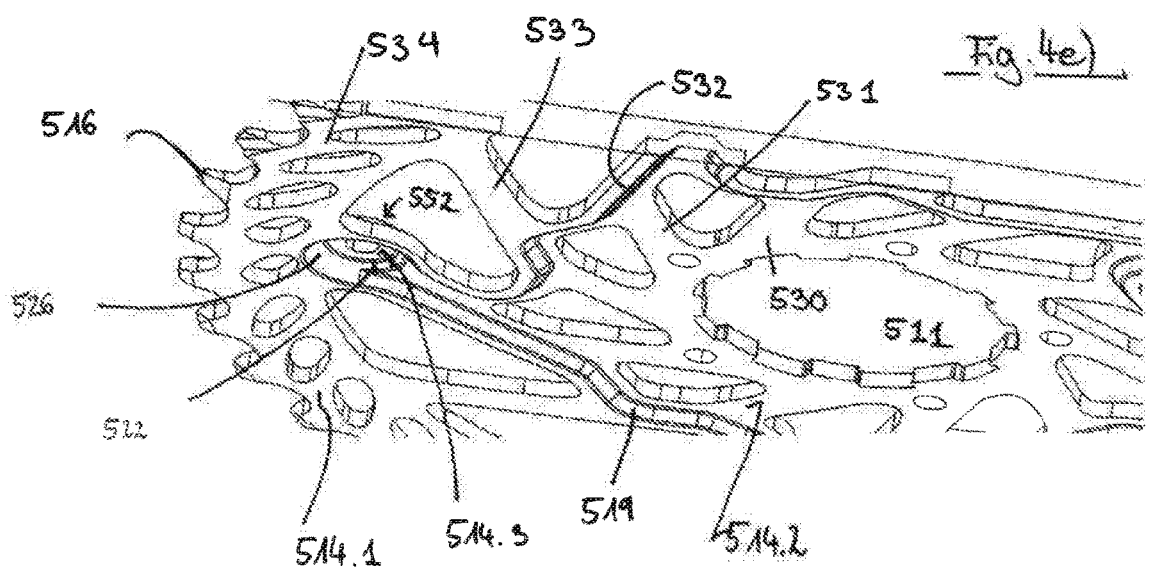

SPROCKET WHEEL FOR A BICYCLE DRIVE

This application claims priority to, and/or the benefit of, German patent application DE 10 2015 203 708.8, filed on Mar. 2, 2015.

FIELD OF THE INVENTION

The invention relates to a sprocket wheel for a bicycle drive.

BACKGROUND

Sprocket wheels with areas that are offset axially relative to one another are known from U.S. Pat. No. 3,477,393, for example, in which axially offset sections serve as integrated spacers between adjacent chain rings on the front wheel of a bicycle.

Similarly, a sprocket wheel with an axial offset, which is used as a sprocket with an integrated spacer for a sprocket assembly on the rear wheel hub of a bicycle, is known from US Patent Application Publication No. 2012/0225745 A1.

Another known practice is to provide mutual axially offset areas or sections on a sprocket wheel in order to increase the stability or stiffness thereof.

Sprocket wheels may be mass-produced articles. It is therefore desirable to be able to post-process and further process them in a simple and time-saving manner.

Given the background of this prior art, it is the object of the present invention to develop the sprocket wheel of the type in question in such a way that it allows post-processing and further processing in a particularly simple, time-saving and advantageous manner.

SUMMARY AND DESCRIPTION

In an embodiment, a sprocket wheel for a bicycle includes a first main surface, which is flat in one or more sections, and a second main surface, which is situated opposite the first main surface. The second main surface is flat in one or more sections and extends parallel to the first main surface in one or more sections. The sprocket wheel also has an outer circumferential surface, which connects the first and the second main surface to one another and on which toothing is provided.

In an embodiment, the first and the second main surfaces each comprise a flat first area and a flat second area, which is offset axially relative to the first area and is connected to the first area by one transitional section or a plurality of transitional sections.

The first area of the first main surface is arranged opposite the first area of the second main surface, in at least one section, and the second area of the first main surface is arranged opposite the second area of the second main surface, in at least one section.

In an embodiment, a sprocket wheel for a bicycle drive includes a first main surface which is flat in at least one section. The sprocket wheel also may include a second main surface disposed opposite the first main surface, the second main surface flat in at least one section and extending parallel to the first main surface in at least one section, the first and the second main surfaces each comprising a flat first area and a flat second area, the second area offset axially relative to the first area and connected to the first area by one or more transitional sections, the first area of the first main surface arranged opposite the first area of the second main surface, in at least one section, and the second area of the first main surface arranged opposite the second area of the second main surface, in at least one section. The sprocket wheel may also include an outer circumferential surface which connects the first and the second main surfaces to one another and on which toothing is provided. The sprocket wheel may be stacked on another sprocket wheel of the same configuration in such a way that the first area of the first main surface of the sprocket wheel rests over an extended area on the first area of the second main surface of the other sprocket wheel, and the first main surface of the sprocket wheel rests over an extended area of the second area of the second main surface of the other sprocket wheel.

In an embodiment a multi-sprocket arrangement for a bicycle drive includes a plurality of sprocket wheels, which are mounted upon one another for conjoint rotation. At least one of the sprocket wheels of the plurality of sprocket wheels includes a first main surface which is flat in at least one section. The at least one sprocket wheel also includes a second main surface disposed opposite the first main surface, the second main surface flat in at least one section and extending parallel to the first main surface in at least one section, the first and the second main surfaces each comprising a flat first area and a flat second area, the second area offset axially relative to the first area and connected to the first area by one or more transitional sections, the first area of the first main surface arranged opposite the first area of the second main surface, in at least one section, and the second area of the first main surface arranged opposite the second area of the second main surface, in at least one section. The at least one sprocket wheel also includes an outer circumferential surface which connects the first and the second main surfaces to one another and on which toothing is provided. The sprocket wheel can be stacked on another sprocket wheel of the same configuration in such a way that the first area of the first main surface of the sprocket wheel rests over an extended area on the first area of the second main surface of the other sprocket wheel, and the first main surface of the sprocket wheel rests over an extended area of the second area of the second main surface of the other sprocket wheel.

In an embodiment, a method for heat treating sprocket wheels includes stacking a plurality of sprocket wheels. At least one of the plurality of sprocket wheels includes a first main surface which is flat in at least one section, a second main surface disposed opposite the first main surface, the second main surface flat in at least one section and extending parallel to the first main surface in at least one section, the first and the second main surfaces each comprising a flat first area and a flat second area, the second area offset axially relative to the first area and connected to the first area by one or more transitional sections, the first area of the first main surface arranged opposite the first area of the second main surface, in at least one section, and the second area of the first main surface arranged opposite the second area of the second main surface, in at least one section, an outer circumferential surface which connects the first and the second main surfaces to one another and on which toothing is provided. The sprocket wheel can be stacked on another sprocket wheel of the same configuration in such a way that the first area of the first main surface of the sprocket wheel rests over an extended area on the first area of the second main surface of the other sprocket wheel, and the first main surface of the sprocket wheel rests over an extended area of the second area of the second main surface of the other sprocket wheel. The method also involves heat treating the stacked plurality sprocket wheels.

BRIEF DESCRIPTION OF THE DRAWINGS

FIGS. 2a) to 2e) show various views of a sprocket wheel which can be used as an end sprocket in a sprocket assembly on a rear wheel hub of a bicycle;

FIGS. 4a) to 4e), show various views of a multi-sprocket arrangement having a sprocket wheel and a sprocket wheel.

DETAILED DESCRIPTION OF THE DRAWINGS

Figure 1D:
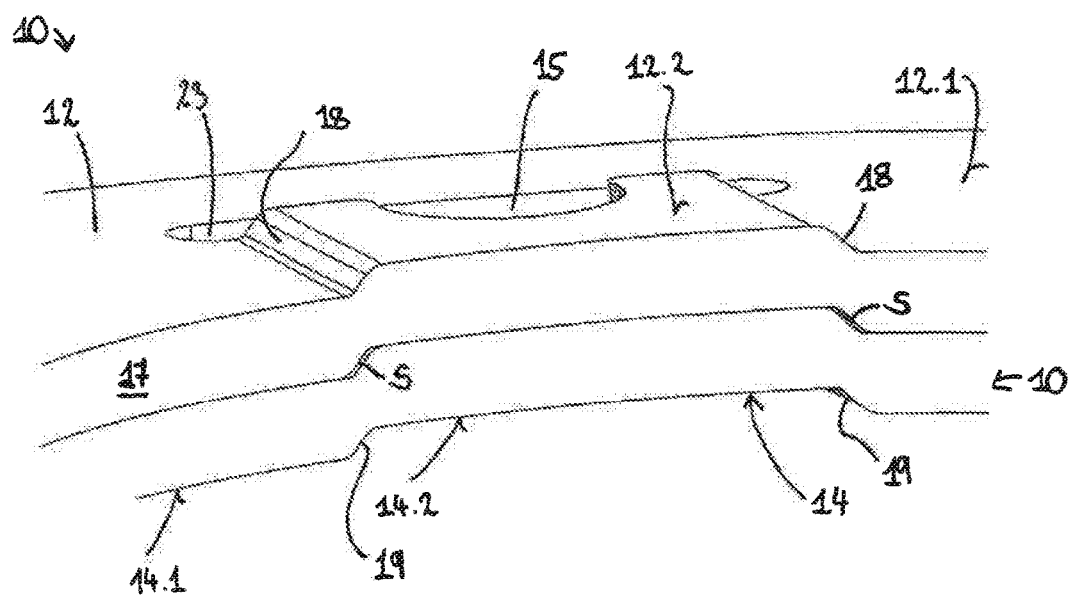
FIGS. 1a) to 1e), show a sprocket wheel in simplified form in various views, it being possible to use said sprocket wheel as a single chain ring for a bicycle.
Figure 1E:
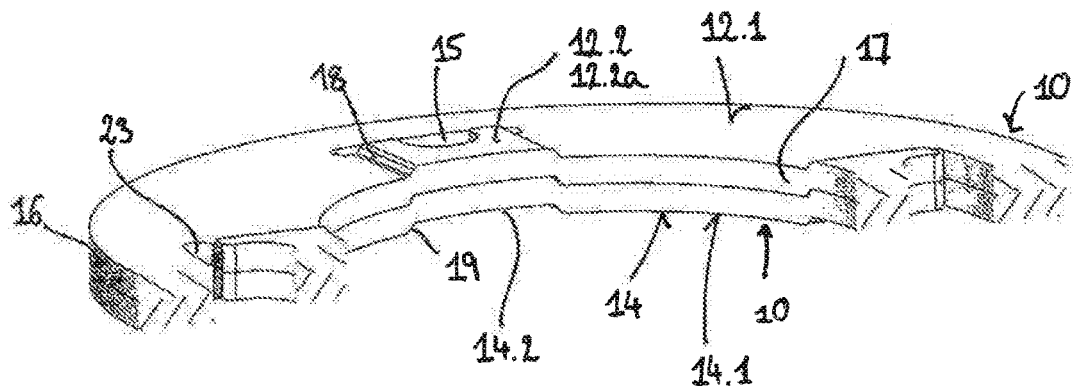

Sprocket wheel construction may allow post-processing and further processing in a particularly simple, time-saving and advantageous manner. In an embodiment, a sprocket wheel can be stacked on another sprocket wheel of the same configuration in such a way that the first area of the first main surface of the sprocket wheel rests over an extended area on the first area of the second main surface of the other sprocket wheel, and that the second area of the first main surface of the sprocket wheel rests over an extended area on the second area of the second main surface of the other sprocket wheel.

In this way, sprocket wheels of the same type can be stacked one above the other and, in this way, bundled, considerably facilitating handling of the sprocket wheels bundled in this way during further processing and, in particular, allowing time-saving and space-saving joint heat treatment of the sprocket wheels stacked one upon the other.

This is particularly advantageous for sprocket wheels made of metal, such as steel, in particular for those with a small number of teeth (e.g. a single front chain ring), which must be hardened in a special process due to the large forces acting during operation.

Due to the fact that the stacked sprocket wheels rest over an extended area upon one another, both in the first and in the second area, centering and positioning of the stacked sprocket wheels relative to one another can be achieved in a simple manner.

The toothing of the sprocket wheel is normally situated on a radially outer edge of the first area. For this reason, provision may therefore be made, both in the case of the first main surface and of the second main surface, for the second area or, if the second area is composed of a plurality of separate sections, at least one, preferably each, of these sections to lie within the first area.

To avoid a situation where the sprocket wheels do not rest on one another in an optimum manner due to manufacturing variation or tolerance range, it is furthermore envisaged, that the sprocket wheel can be stacked on another sprocket wheel of the same configuration in such a way that a gap, preferably an encircling gap, is provided between each of the transitional sections of the first main surface of the sprocket wheel and the corresponding transitional sections of the second main surface of the other sprocket wheel.

The transitional sections of the first main surface of the sprocket wheel and of the second main surface of the other sprocket wheel may not touch over an extended area, and in an embodiment they do not touch at all.

In an embodiment, a width of the gap between the directly adjacent transitional sections of two sprocket wheels stacked one upon the other is not less than 2.5 times the tolerance range for the thickness or for the contour of the sprocket wheels, and/or is not less than 0.2 millimeters (mm).

In an embodiment, the second area of the first and of the second main surface can in each case be a single, continuous section, but provision can also be made for the second area of the first and of the second main surface to be in each case composed of a plurality of separate sections. The separate sections may be distributed at regular intervals over the circumference of the sprocket wheel.

In an embodiment, provision can be made, both in the case of the first and of the second main surface, for the second area to be arranged radially within, preferably concentrically within, the first area, resulting in a radial step.

What has been described above can be applied generally to three or more areas. In particular, there is provision, according to an embodiment, for both the first and the second main surface to have a third area, which is connected to the second area of the respective main surface by at least one further transitional section, and is offset axially relative to the second area. The sprocket wheel may be stacked on the other sprocket wheel of the same configuration in such a way that the third area of the first main surface of the sprocket wheel rests over an extended area on the third area of the second main surface of the other sprocket wheel.

In an embodiment, if the further transitional sections of the first main surface of the sprocket wheel and of the second main surface of the other sprocket wheel do not touch over an extended area or if there is a gap formed between them. This gap too preferably has the minimum width stated above.

In this embodiment, it is possible, both in the case of the first and of the second main surface, for the third area to be arranged radially within, preferably concentrically within, the second area.

It is thereby possible to produce a structure with a plurality of radial steps which makes it possible to achieve a particularly large total axial offset, which cannot be achieved with a single step structure for reasons connected with manufacture.

During the production of sprockets of conventional thickness for a bicycle drive, an upper limit of about 1.2 mm has been obtained experimentally for an axial offset of a single structural step. For example, since geometrical conditions which must be met for stackability, a relatively large axial offset cannot be achieved, or can be achieved only with difficulty, in a single structural step in production. If a relatively large total offset is to be achieved, this large total offset may be divided into several steps in the manner described above.

If the axially offset second area is to serve as an integrated spacer, provision can be made for the sprocket wheel to comprise a fastening structure, which is provided on a flat section of the first and second main surface. In an embodiment, the fastening structure may be in the form of a plurality of fastening holes or apertures for screws, pins or rivets.

If the second or third area is composed of a plurality of separate sections, provision can be made for these separate sections of the second or third area and the associated transitional sections for the first and second main surface to be designed in such a way that cup-type depressions or elevations, which may be circular, are in each case formed. In an embodiment, in each of the depressions or elevations a fastening opening is preferably provided as a fastening structure.

The cup-type depressions or elevations may serve as spacers between adjacent sprocket wheels, and can be combined with at least one further area offset axially relative to the first area, e.g. with inner regions of connecting arms. The inner regions may be offset axially relative to the first area. The combination may be effected as explained below using FIGS. 4a) to 4e) as an example, or, alternatively, the inner regions may be offset with edge regions of connecting arms, said edge regions being offset axially relative to the first area in order to increase stiffness and being of the kind indicated in FIGS. 3a) to 3g) for sprocket wheel 310. Here too, the various flat areas of the first main surface of the sprocket wheel rest over an extended area on the corresponding flat areas of the second main surface of the other sprocket wheel.

In an embodiment, a multi-sprocket arrangement for a bicycle drive includes a plurality of sprocket wheels, which are mounted upon one another for conjoint rotation, wherein at least one, preferably each, of the sprocket wheels is a sprocket wheel of the kind described herein.

In an embodiment, provision can be made for such a multi-sprocket arrangement to be formed from three sprocket wheels wherein the two outer sprocket wheels have cup-type depressions or elevations, which are preferably circular in plan view and serve as spacers between the outer sprocket wheels and a central sprocket wheel. The central sprocket wheel can also have an axial offset, which serves to stabilize the structure and/or increase stiffness, for example. The central sprocket wheel may also be a conventional sprocket wheel without an axial offset.

Figure 5:
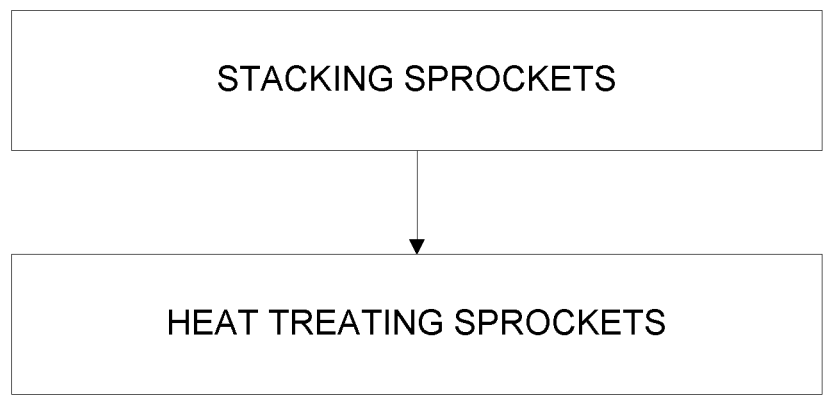
FIG. 5 is a flowchart for a method of heat treating sprockets.

In an embodiment, such as is shown in FIG. 5, a method involves the following steps: stacking a plurality of sprocket wheels of the same type, such as are described herein, and heat treating the sprocket wheels in the stacked state.

In this embodiment, the sprocket wheels may be stacked in such a way that, for each sprocket wheel which is stacked on another sprocket wheel, the various flat areas of the first main surface of the sprocket wheel rest over an extended area on the corresponding flat areas of the second main surface of the other sprocket wheel. An axial force may also be exerted on the stacked sprocket wheels, at least during the heat treatment.

If the axial offset of the sprocket wheels is too large, or stacking is not possible for other reasons, it is also possible to carry out joint heat treatment of a plurality of sprocket wheels of the same type by in each case placing an insert, preferably an annular insert, between the first main surface of the respective upper sprocket wheel and the second main surface of the respective lower sprocket wheel. These inserts can be repeatedly reused.

Embodiments of the invention, which are shown in the attached figures, are further described below. For clarity, the components have not all been indicated by reference signs in each of the various views, especially where several components of the same kind are present in a single figure.

FIG. 1a) shows a perspective illustration of a sprocket wheel 10 having a central opening 11 in accordance with a first embodiment of the invention and allows a view of the second main surface 12 of the sprocket wheel 10, while the first main surface 14, which is opposite the second main surface 12, is largely turned away from the observer.

In FIGS. 1a) to 1e) the illustration is simplified in as much as the toothing on the outer circumferential surface 16 connecting the first and the second main surfaces 14, 12 to one another is not shown.

Both main surfaces 12, 14 are flat in at least one section, parallel to one another in at least one section and each comprise a first area 12.1, 14.1 and a second area 12.2, 14.2, which are offset axially (based on the axis of rotation A of the sprocket wheel 10) relative to one another. More specifically, in the same direction and with the same amount of offset h (cf. FIG. 1c)).

In the example under consideration, the first area 12.1 or 14.1 in each case accounts for a large part of the second main surface 12 and of the first main surface 14, respectively. The second areas 12.2 and 14.2 are each composed of four individual sections 12.2a, 14.2a, which are distributed uniformly around the circumference of the sprocket wheel 10, at the radially inner edge 17 thereof, and each have the basic shape of a circular ring segment, wherein a semicircular recess is provided at the radially outer edges of each of the sections 12.2a, 14.2a as a fastening structure 15 for a screw (not shown here). The sections 12.2a, 14.2a in the form of circular ring segments are each separated from the radially outer region of the first area 12.1 and 14.1, respectively, by a slot 23 extending substantially in a circumferential direction.

The individual sections 12.2a and 14.2a of the second areas 12.2 and 14.2, respectively, are each offset axially relative to the first areas 12.1 and 14.1, respectively, by an amount of offset h (cf. FIG. 1c)) and are connected to the first areas 12.1 and 14.1, respectively, by obliquely extending transitional sections 18 and 19, respectively.

FIG. 1b) illustrates two sprocket wheels 10 stacked one upon the other. The sprocket wheels 10 are shaped in such a way that a plurality of sprocket wheels 10 of the same type can in each case be stacked so that the first main surface 14 of the upper sprocket wheel 10 rests over an extended area on the second main surface 12 of the lower sprocket wheel 10. To be more precise, according to the invention the first area 14.1 of the first main surface 14 of the upper sprocket wheel 10 rests over an extended area on the first area 12.1 of the second main surface 12 of the lower sprocket wheel 10, and the second area 14.2 of the first main surface 14 of the upper sprocket wheel 10 rests over an extended area on the second area 12.2 of the second main surface 12 of the lower sprocket wheel 10.

The axial offset and the corresponding transitions may be configured in such a way that the resulting elevation on the upper side of the sprocket wheel fits precisely into the corresponding depression on the underside of the sprocket wheel.

By virtue of the superposed axially offset sections 12.2a, 14.2a, the resulting sprocket wheel stack is particularly stable and self-centered. In this way, it is possible for a plurality of sprocket wheels to be handled jointly and in a simple manner in the stacked state, and for said sprocket wheels to be subjected jointly to a heat treatment.

FIG. 1c) represents an enlarged view of the structures from FIG. 1b), which are stacked one upon the other on a base F, the view being in a radial direction from the central opening 11. This view shows that the transitional sections 18, 19 of the stacked sprocket wheels 10 do not touch, or at least do not touch over an extended area. This is also clear in the perspective views in FIGS. e) and 1f). This ensures that the flat areas 12.1, 12.2, 14.1, 14.2 of the two main surfaces 12, 14 can also rest securely one upon the other, even when the manufacturing tolerances, especially those for the transitional sections 18, 19, are taken into account.

In particular, the width d of the gap between the superposed transitional sections 18, 19 of two stacked sprocket wheels of the same type can satisfy the relation $2.5\delta \leq d$, where $\delta$ is the tolerance range for the thickness t of the sprocket wheel 10 or for the contour thereof. The width d of the gap is preferably not less than 0.2 mm.

The width of the gap may not be substantially constant, the mean width and/or, the maximum width of the gap can be indicated by "the width d".

The sprocket wheel 10 can be mounted on a crank by fasteners such as four fastening screws accommodated in the recesses 15. Through an appropriate selection of the axial offset h between the first and second areas of the first and second main surface, it is possible to mount a single sprocket wheel on a crank that has been designed for two sprocket wheels, while nevertheless achieving the axial position of the toothing that corresponds to the desired chain line.

FIGS. 2*a*) to 2*d*) shows various views of a sprocket wheel 110 according to a second embodiment.

Components and features of the second embodiment which correspond to those in the first embodiment are denoted by reference signs derived from those in the first embodiment by adding the number 100. Where letters are used as reference signs, the same reference signs are used for all the embodiments. The second embodiment is described in detail to the extent that it differs from the first embodiment in the above description of which reference is otherwise made.

FIG. 2*a*) shows a plan view of the second main surface 112 of sprocket wheel 110. Here (in contrast to FIGS. 1*a*) to 1*e*)), toothing 116*z* provided on the outer circumferential surface 116 is also shown. FIG. 2*d*) shows a plan view of the first main surface 114.

In contrast to the first embodiment, the first main surface 114 and the second main surface 112 of sprocket wheel 110 comprise three concentrically arranged areas 114.1, 114.2, 114.3 and 112.1, 112.2, 112.3, which are offset axially relative to one another and form a multi-step structure, as can be seen from the sectioned representation in FIG. 2*b*) and the perspective partial views in FIGS. 2*c*) and 2*e*).

The areas are connected to one another by obliquely extending transitional sections 118, 121, 119, 122, which are configured in such a way that sprocket wheels of the same type can be stacked one upon the other.

In plan view, sprocket wheel 110 comprises an inner ring 130, a central ring 132 and an outer ring 134, on which the toothing 116*z* is provided. The inner ring 130 and the central ring 132 are connected to one another by a plurality of inner connecting arms 131, while the central ring 132 and the outer ring 134 are connected to one another by a plurality of outer connecting arms 133. Between the connecting arms and the rings there are weight-reducing openings 135, which are arranged in two concentric circles.

In the embodiment under consideration, the transitional sections 118, 119 between the first area 112.1, 114.1 and the second area 112.2, 114.2 are situated on the outer connecting arms 133, while the transitional sections 121, 122 between the second area 112.2, 114.2 and the third area 112.3, 114.3 are situated on the boundary between the inner connecting arms 131 and the central ring 132.

Apart from the multi-step structure, the form of sprocket wheel 110 is similar to that of the end sprocket 16 which is shown in FIG. 7 of EP 2319752 A2 and to the description of which reference is made by way of supplementary information, particularly paragraphs [0035] to [0037] of EP 2319752 A2.

A plurality of fastening openings 115 is provided both in the first areas 112.1, 114.1 and in the third areas 112.3, 114.3 of the second and the first main surface. These can be used, for example, to connect the sprocket wheel 110 shown to further sprocket wheels or other components of a sprocket arrangement by means of pins (not shown here), as is described in detail in EP 2319752 A2.

By means of the multi-step structure shown in FIGS. 2*a*) to 2*e*), a particularly large total axial offset 2 h can be achieved (n·h in the case of n steps of the same height). This is particularly advantageous for an end sprocket of a sprocket assembly to enable the end sprocket to be positioned as close as possible to the spokes of the road wheel or as far as possible in the direction of the center plane of the bicycle in order to be able to provide more installation space for the other sprockets and thus to accommodate a larger number of sprockets.

FIGS. 3*a*) to 3*g*), show a multi-sprocket arrangement comprising three sprocket wheels (sprockets) 210, 310 and 410 according to the invention of various sizes. The resulting multi-sprocket arrangement is given the reference sign 888. FIGS. 4*a*) to 4*c*) show another multi-sprocket arrangement 999 with a conventional sprocket wheel 599 and a sprocket wheel 510 according to an embodiment, which is shown once again separately in FIGS. 4*d*) and 4*e*).

Features and components of sprocket wheels 210, 310, 410 and 510 (cf. FIG. 4*a*) to 4*e*)) which correspond to those of the sprocket wheel 10 from FIGS. 1*a*) to *e*) are denoted by reference signs which are derived from those in FIGS. 1*a*) to *e*) by adding the numbers 200, 300, 400 and 500 respectively. Once again, primarily differences with respect to the first two embodiments are described, while reference is otherwise made to the above description thereof.

FIG. 3*a*) shows a plan view of the sprocket arrangement 888 in which the largest sprocket 210 is at the top, while FIG. 3*b* shows a plan view of the sprocket arrangement 888 in which the smallest sprocket 410 is at the top.

FIG. 3*c*) shows a side view, FIG. 3*d*) shows a section along the line D-D in FIG. 3*b*), and FIG. 3*e*) shows an exploded view of the multi-sprocket arrangement 500.

Figure 3F:
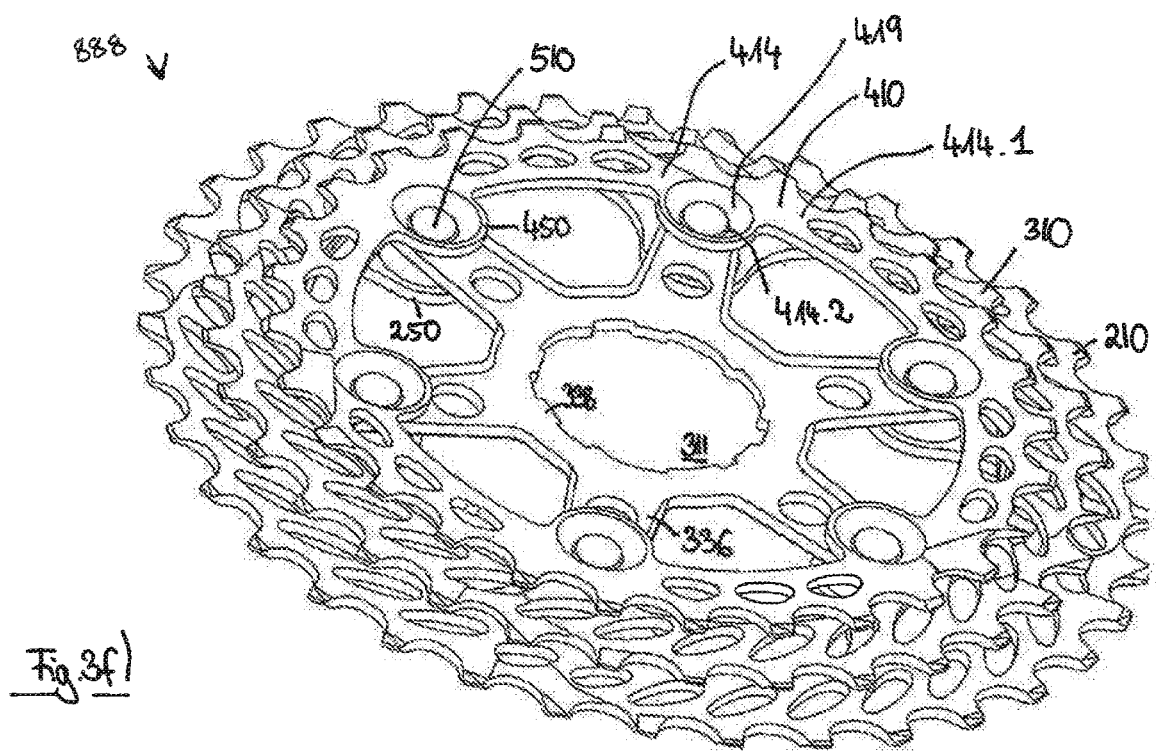
FIGS. 3a) to 3g), show various views of a multi-sprocket arrangement having two or three sprocket wheels.
Figure 3G:
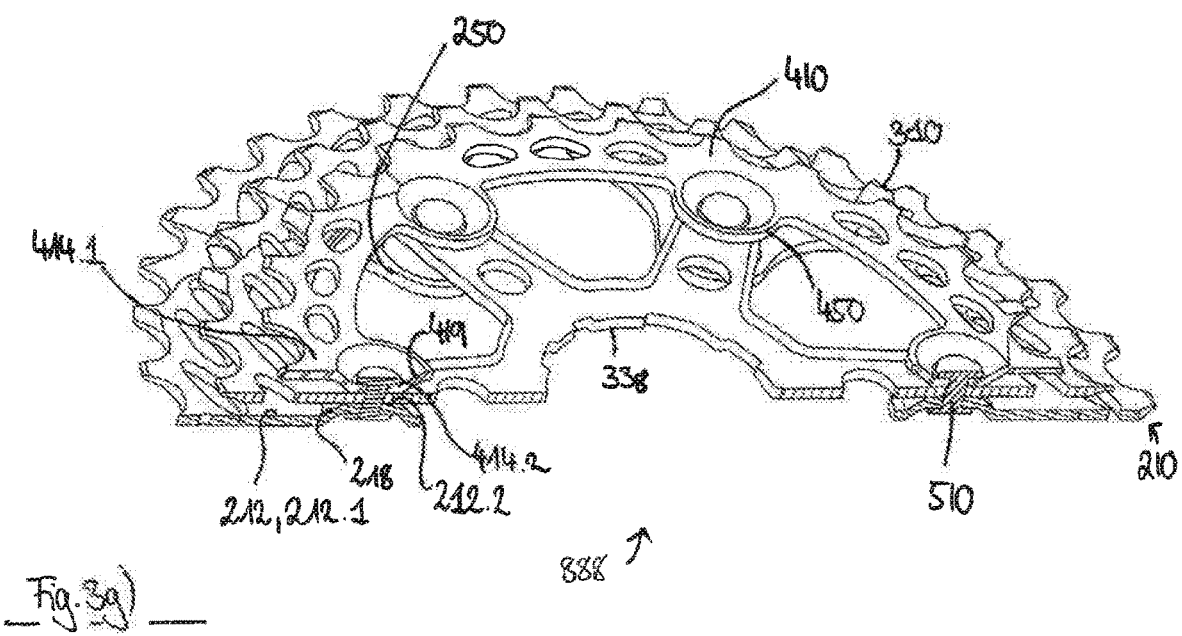

Finally, FIGS. 3*f*) and 3*g*) show perspective views of the multi-sprocket arrangement 500, complete (FIG. 3*f*)) and in a view (FIG. 3*g*)) in which the sprocket arrangement 888 has been halved in a plane containing the axis of rotation A of the sprocket arrangement 888.

In the multi-sprocket arrangement 888 shown in FIGS. 3*a*) to 3*g*), the smallest sprocket 410 and the largest sprocket 210 are each substantially in the form of circular rings and have radially inward-projecting fastening lugs 450 and 250 which are distributed uniformly around the circumference of the respective sprocket. Since sprockets 210 and 410 correspond in the basic form thereof, only the largest sprocket 210 will be described below.

As with the first embodiment, the second area 212.2, 214.2 of the second and the first main surface 212, 214 of sprocket 210 is in each case composed of a plurality of separate sections 212.2*a*, 214.2*a*, although here, in contrast to the first embodiment, these are substantially annular in plan view and are situated in the region of the fastening lugs 250, with the result that the separate sections 212.2*a*, 214.2*a* and the associated transitional sections 218, 219 each form cup-type depressions or elevations 252. In each depression or elevation a fastening opening 215 is provided as a fastening structure.

These depressions or elevations are used as integrated spacers when the sprockets 210 and 410 are fastened on the central sprocket 310 by the rivets 399.

The central sprocket 310 has an inner ring 330 and an outer ring 334, which are connected to one another by radial connecting arms 336. Drive elements 338 can be provided on the inner circumference of the inner ring. In an embodiment, the drive elements 338 are intended to engage in a driver (not shown) in order to transmit torque from sprocket 310 to the driver and, via the latter, to the rear wheel of a bicycle.

A fastening opening 315 is provided at the radially outer end of each connecting arm 336. This is used to fasten sprockets 210 and 410 jointly on the central sprocket 310 with one rivet 399.

The central sprocket 310 can be designed without an axial offset, but the central sprocket 310 can also be a stackable sprocket wheel according to the invention with an axial offset, on which the outer edges of the connecting arms 336 and the inner edge of the outer ring 334 adjoining the connecting arms 336 can be offset axially relative to the inner region of the connecting arms 336 and the outer region of the outer ring 334, for example, in order to increase the stability of the central sprocket 310.

FIGS. 4a) to 4e) show another example of a multi-sprocket arrangement 999 with a sprocket wheel 510 according to an embodiment and a conventional sprocket wheel 599, which forms the smaller of the two sprocket wheels in the present case.

In the plan view in FIGS. 4a) and 4b), sprocket wheel 510 is similar to sprocket wheel 110 from FIGS. 2a) to 2e), having an inner ring 530, which is connected by inner connecting arms 531 to a central ring 532, which, once again, is connected by outer connecting arms 533 to an outer ring 534, on the outer edge of which toothing 516 is provided.

As with sprocket wheel 110, both the first main surface 514 and the second main surface 512 of sprocket wheel 510 each comprise a first area 514.1, 512.1 and a second area 514.2, 512.2, which is arranged completely within the first area 514.1, 512.1.

In contrast to sprocket wheel 110, however, the second area 514.2, 512.2 of sprocket wheel 510 does not extend only over the inner ring 530 and the inner connecting arms 531 but also over the inner region of the central ring 532 and, in four "spurs" 533a, into each second outer connecting arm 533.

At the radially outer end of each second connecting arm 533, the second area 514.2, 512.2 is connected by a further connecting section 522, 521 to a circular section 514.3a, 512.3a of a third area 514.3, 512.3, which is offset axially relative to the second area 514.2, 512.2. Via additional transitional sections 526, 525, the individual sections 514.3a, 512.3a of the third area 514.3, 512.3 are each connected directly to the first area 514.1, 512.1 in the region of the outer ring 534.

Provided in the individual sections 514.3a, 512.3a of the third area 514.3, 512.3 there are through-openings as fastening structures 515, in which screws 666 that connect sprocket wheel 510 to the conventional sprocket wheel 599 for conjoint rotation are accommodated.

Here, the axial spacing between the two sprocket wheels 510 and 599 is given by the sum of the axial offset between the first and the second area and the axial offset between the second and the third area of the first or second main surface of sprocket wheel 510.

Thus, sprocket wheel 510 combines the inner region shown in FIGS. 2a) to 2e), which is offset axially relative to the outer region of the sprocket wheel, with the "cup-type" spacers shown in FIGS. 3a) to 3g).

However, many other combinations of different flat areas offset axially relative to one another are possible as long as two sprocket wheels of the same type can be stacked one upon the other in such a way that each area of the first main surface of the upper sprocket wheel rests over an extended area on the corresponding area of the second main surface of the lower sprocket wheel.

The production of such sprocket wheels is possible, for example, by first punching blanks out of a plate-shaped material and then forming them under pressure, if required in suitably designed tools, to produce sprocket wheels with areas offset axially relative to one another.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A sprocket wheel for a bicycle drive, comprising:
   a first main surface which is flat in at least one section;
   a second main surface disposed opposite the first main surface, the second main surface flat in at least one section and extending parallel to the first main surface in at least one section, the first and the second main surfaces each comprising a flat first area and a flat second area, the second area offset axially relative to the first area and connected to the first area by one or more transitional sections, the first area of the first main surface arranged opposite the first area of the second main surface, in at least one section, and the second area of the first main surface arranged opposite the second area of the second main surface, in at least one section; and
   an outer circumferential surface which connects the first and the second main surface to one another and on which toothing is provided,
   wherein the sprocket wheel can be stacked on another sprocket wheel of the same configuration in such a way that the first area of the first main surface of the sprocket wheel rests over an extended area on the first area of the second main surface of the other sprocket wheel, and the second area of the first main surface of the sprocket wheel rests over an extended area of the second area of the second main surface of the other sprocket wheel, and
   wherein the sprocket wheel can be stacked on the other sprocket wheel of the same configuration of the first main surface, the second main surface, and the outer circumferential surface.

2. The sprocket wheel of claim 1, wherein both in the first and of the second main surface, the second area or, if the second area is composed of a plurality of separate sections, at least one of these sections lies within the first area.

3. The sprocket wheel of claim 2, wherein the sprocket wheel can be stacked on the other sprocket wheel of the same configuration in such a way that a gap, is formed between each of the transitional sections of the first main surface of the sprocket wheel and the corresponding transitional sections of the second main surface of the other sprocket wheel.

4. The sprocket wheel of claim 3, wherein the gap is an encircling gap.

5. The sprocket wheel of claim 3, wherein the sprocket wheel can be stacked on the other sprocket wheel of the same configuration in such a way that the transitional sections of the first main surface of the sprocket wheel and of the second main surface of the other sprocket wheel do not touch over an extended area.

6. The sprocket wheel of claim 5, wherein the sprocket wheel can be stacked on the other sprocket wheel of the same configuration in such a way that the transitional sections of the first main surface of the sprocket wheel and of the second main surface of the other sprocket wheel do not touch at all.

7. The sprocket wheel of claim 3, further configured such that when stacked, the width of the gap between the transitional sections of the first main surface of the sprocket wheel and the corresponding transitional sections of the second main surface of the other sprocket wheel is in each case not less than 2.5 times a tolerance range (δ) for the thickness (t) or for the contour of the sprocket wheels.

8. The sprocket wheel of claim 3, further configured such that when stacked, the width of the gap between the transitional sections of the first main surface of the sprocket wheel and the corresponding transitional sections of the second main surface of the other sprocket wheel is in each case not less than 0.2 millimeters.

9. The sprocket wheel of claim 3, wherein the second area of the first and of the second main surface is composed of a plurality of separate sections distributed at regular intervals over the circumference of the sprocket wheel.

10. The sprocket wheel of claim 3, wherein the second area of the first main surface and the second main surface is arranged radially within the first area.

11. The sprocket wheel of claim 10, wherein the second area of the first main surface and the second main surface is arranged concentrically within the first area.

12. The sprocket wheel of claim 1, further comprising a fastening structure disposed on a flat section of the first and second main surface.

13. The sprocket wheel of claim 12, wherein the fastening structure comprises one or more fastening holes or apertures for screws, pins or rivets.

14. A sprocket wheel for a bicycle drive, comprising:
a first main surface which is flat in at least one section;
a second main surface disposed opposite the first main surface, the second main surface flat in at least one section and extending parallel to the first main surface in at least one section, the first and the second main surfaces each comprising a flat first area and a flat second area, the second area offset axially relative to the first area and connected to the first area by one or more transitional sections, the first area of the first main surface arranged opposite the first area of the second main surface, in at least one section, and the second area of the first main surface arranged opposite the second area of the second main surface, in at least one section; and
an outer circumferential surface which connects the first and the second main surface to one another and on which toothing is provided,
wherein the sprocket wheel can be stacked on another sprocket wheel of the same configuration in such a way that the first area of the first main surface of the sprocket wheel rests over an extended area on the first area of the second main surface of the other sprocket wheel, and the second area of the first main surface of the sprocket wheel rests over an extended area of the second area of the second main surface of the other sprocket wheel,
wherein both in the first and of the second main surface, the second area or, if the second area is composed of a plurality of separate sections, at least one of these sections lies within the first area,
wherein the sprocket wheel can be stacked on the other sprocket wheel of the same configuration in such a way that a gap, is formed between each of the transitional sections of the first main surface of the sprocket wheel and the corresponding transitional sections of the second main surface of the other sprocket wheel, wherein both the first and the second main surfaces further comprise a third area, the third area connected to the second area of the respective main surface by at least one further transitional section and is offset axially relative to the second area, and wherein the sprocket wheel can be stacked on the other sprocket wheel of the same configuration in such a way that the third area of the first main surface of the sprocket wheel rests over an extended area on the third area of the second main surface of the other sprocket wheel.

15. The sprocket wheel of claim 14, wherein the at least one further transitional section of the first main surface of the sprocket wheel and of the second main surface of the other sprocket wheel do not touch over an extended area.

16. The sprocket wheel of claim 14, wherein the third area of both the first and of the second main surface is arranged radially within the second area.

17. The sprocket wheel of claim 16, wherein the third area of both the first and of the second main surface is arranged concentrically within the second area.

18. The sprocket wheel of claim 14, wherein the second or the third area of the first and of the second main surface are composed of a plurality of separate sections, the separate sections of the second or third area and the associated transitional sections of the first and second main surface designed in such a way that they each form cup-type depressions or elevations.

19. The sprocket wheel of claim 18, wherein the depressions or elevations are circular in plan view, and in each of the depressions or elevations a fastening opening is provided as a fastening structure.

* * * * *